(12) United States Patent
Faris et al.

(10) Patent No.: US 7,034,909 B2
(45) Date of Patent: *Apr. 25, 2006

(54) SUPER BROAD-BAND POLARIZING REFLECTIVE MATERIAL

(75) Inventors: Sadeg M. Faris, Pleasantville, NY (US); Le Li, Yorktown Heights, NY (US); Yingqiu Jiang, Sunnyvale, CA (US)

(73) Assignee: Reveo, Inc., Elmsford, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 10/888,960

(22) Filed: Jul. 9, 2004

(65) Prior Publication Data

US 2005/0030446 A1    Feb. 10, 2005

Related U.S. Application Data

(63) Continuation of application No. 10/023,032, filed on Dec. 12, 2001, now Pat. No. 6,774,961, which is a continuation of application No. 09/066,403, filed on Apr. 30, 1998, now abandoned, which is a continuation of application No. PCT/US96/17464, filed on Oct. 29, 1996.

(51) Int. Cl.
*G02F 1/1335* (2006.01)
*G02F 1/13* (2006.01)

(52) U.S. Cl. ............................ 349/98; 349/96; 349/194

(58) Field of Classification Search .................. 349/96, 349/98, 194; 252/299.7, 585; 359/500
See application file for complete search history.

(56) References Cited

U.S. PATENT DOCUMENTS 3,650,603 A    3/1972    Heilmeier et al.

(Continued)

FOREIGN PATENT DOCUMENTS

EP    0506176    3/1993

(Continued)

OTHER PUBLICATIONS

A Single-Layer Super Broadband Reflective Polarizer. by Le Li and Sadeg M. Faris., SID Internatioanl Symposium, Digest of Tech Paper, vol. 27, 1996, p. 111-113.

(Continued)

*Primary Examiner*—Tarifur R. Chowdhury

(57) ABSTRACT

Disclosed are super broadband circularly polarizing film materials and novels methods of fabricating and using the same. The circularly polarizing materials are made from a film of material, such as a CLC polymer having a cholesteric order, in which a liquid crystal material, such as a nematic liquid crystal material, is distributed in a non-linear fashion across the thickness of the film in a plurality of liquid crystal-rich and liquid crystal-depleted sites in the CLC polymer. The pitch of the helices of the CLC molecules in the polyermized CLC material varies in a non-linear (e.g. exponential) manner along the depth dimension (i.e. transverse to the surface) thereof. The resulting circularly polarizing materials have reflection and transmission characteristics over bands of operation approaching 2000 nm. Depending on the final spiral structure of the materials utilized, the CLC circularly polarizing materials reflect either left-handed or right-handed circularly polarized light.

39 Claims, 6 Drawing Sheets

U.S. PATENT DOCUMENTS

| | | | |
|---|---|---|---|
| 4,114,990 A | 9/1978 | Mash et al. | 349/193 |
| 4,388,453 A | 6/1983 | Finkelmann et al. | 528/15 |
| 4,637,896 A | 1/1987 | Shannon | 252/299.7 |
| 4,944,578 A | 7/1990 | Denison | 349/6 |
| 5,132,147 A | 7/1992 | Takiguchi et al. | 427/393.5 |
| 5,188,760 A | 2/1993 | Hikmet et al. | 252/299.1 |
| 5,319,478 A | 6/1994 | Funfschilling et al. | 349/181 |
| 5,412,492 A | 5/1995 | Zammit et al. | 349/1 |
| 5,427,828 A | 6/1995 | Park | 349/183 |
| 5,486,935 A | 1/1996 | Kalmanash | 349/194 |
| 5,506,704 A | 4/1996 | Broer et al. | 349/98 |
| 5,691,789 A | 11/1997 | Li et al. | 349/98 |
| 6,034,753 A | 3/2000 | Li et al. | 349/98 |
| 6,181,395 B1 | 1/2001 | Li et al. | 349/98 |

FOREIGN PATENT DOCUMENTS

| | | |
|---|---|---|
| EP | 0606940 | 7/1994 |
| GB | 2010529 | 6/1979 |
| GB | 2017579 | 10/1979 |
| WO | WO 96/02016 | 1/1996 |

OTHER PUBLICATIONS

Terraces in the Cholesteric Phase of DNA Liquid Crystals by David H. VanWinkle, et. al., J. Chem. Phys., vol. 97, No. 8, 1992, p. 5641-5646.

Polarizing Color Filters Made From Cholesteric LC Silicones by Robert Maurer, et. al., SID 90 Digest, vol. 0, No. 0, 1990, p. 110-113.

Orientation of Liquid Crystals in a Spherical Volume by Zharkova et al., Sov. Phys. Crystallogr., vol. 34, No. 3, 1989, p. 414-417.

Hydrodynamics Instabilities of Cholesterics Under a Thermal Gradient by Dubois-Violette, Le Journal de Physique, vol. 34, No. 0, 1972, p. 107-113.

Scarabaeid Beetle Exocuticle as an Optical Analogue of Cholesteric Liquid Crysta by Neville et al., Biological Reviews of the Cambridge Philo. Soc., vol. 0, No. 0, 1969, p. 531-562.

SUPER BROAD-BAND POLARIZING REFLECTIVE MATERIAL

This application is a continuation of U.S application Ser. No., 10/023,032 filed Dec. 12, 2001, now U.S. Pat. No. 6,774,961 which is a continuation of U.S. application Ser. No. 09/066,403, filed Apr. 30, 1998, now abandoned, which is a continuation of PCT/US96/17464 filed Oct. 29, 1996.

BACKGROUND OF THE INVENTION

1. Technical Field

The present invention relates generally to circularly polarizing reflective material made from single layer Cholesteric Liquid Crystal (CLC) film material having "super" broad-band reflection and transmission band characteristics approaching 2000 nm, and also to various novel methods for fabricating and using the same in diverse applications.

2. Background Art

In the modern world, there are numerous applications which require circularly polarizing material having broad-band reflection and transmission characteristics. Such applications range from polarizing filters used in optical systems, to highly reflective pigments used in the manufacture of CLC-based paints and inks.

A detailed review of the prior art literature reveals that European Patent Application 94200026.6 entitled "Cholesteric Polarizer and Manufacture Thereof", published Jul. 20, 1994 and assigned to Philips Electronics, N.V. of Eindhoven, Netherlands (the "Phillips reference"), is the most relevant prior art reference as it discloses several methods on how to make a single layer CLC film material having broad-band reflection and transmission characteristics. In order to achieve its broad-band reflection and transmission characteristics, which are limited to about 400 nm, the Phillips disclosure requires adding a UV dye into the CLC mixture in order that the pitch of the CLC material change "linearly" from its maximum value at one film surface to its minimum value at the other film surface, wherein the difference between the maximum pitch and minimum pitch is greater than 100 nm.

According to the first fabrication technique disclosed in the Phillips reference, prior art CLC polarizing material is formed from two polymerizable chiral and nematogenic monomers, each of which has a different reactivity. During polymerization of the mixture by means of actinic radiation, a linear variation in actinic radiation intensity (i.e. a linear actinic radiation intensity gradient) is realized across the optically active layer of film by introducing an ultraviolet (UV) absorbing dye into the original mixture. This linear radiation intensity gradient causes the most reactive monomer to be preferentially incorporated into the least reactive monomer to occur at the locations of the highest radiation intensity. As a result, at least one concentration gradient of free monomers is formed during polymerization, causing the monomer to diffuse from locations with a low monomer concentration to location with a high concentration. The monomers of high reactivity diffuse to locations where the radiation intensity is highest. This diffusion process results in an increase in reactive monomers in areas of the formed polymer material where, during polymerization, the radiation intensity is highest. As a result, the composition of the material varies in a direction transverse to the surfaces of the film such that a "linear variation" in the pitch of the molecular helices results in the layer formed by the polymer. The liquid crystal material is distributed linearly across the thickness of the film. This variation in pitch provides the optically active layer with a bandwidth proportional to the variation in the pitch of the molecular helices. In thin CLC film structures, the maximum bandwidth variation achievable using this prior art fabrication technique is about 400 nm.

According to the second fabrication method disclosed in the Phillips reference, the spontaneous diffusion of monomers into a polymerizable CLC film is followed by UV polymerization. This fabrication method is carried out by depositing a film of reactive monomers on the surface of a polymerized film of CLC material. The diffusion of monomers into the CLC film layer causes a concentration gradient in the layer before diffusion is halted. As a result, the original CLC layer swells slightly causing an increase in pitch of the molecular helices. This provides a concentration gradient which, in turn, results in a "linear variation" in pitch across the film thickness. Polymerization of the layer by actinic radiation halts diffusion providing a broad-band polarizer having reflection characteristics approaching 400 nm in thin CLC film structures.

Notably, in fabrication techniques disclosed in the Phillips reference described above, the two principal materials utilized in the starting mixtures thereof are characterized as monomers having different reactivities. Moreover, when a dye is not utilized in the fabrication processes of the Phillips reference, a diffusion gradient is not established and both of the principal materials are polymerized, resulting in a narrow band polarizer.

While the above described Phillips reference discloses several methods for fabricating CLC-based circularly polarizing film having reflection characteristics approaching 400 nm in thin film structures, such bandwidth characteristics are inadequate in numerous applications where bandwidth characteristics up to five times greater are required. Also, such prior art fabrication methods require that the constituent materials both be polymerizable, restricting the many types of commercially available material that can be used during manufacture.

Thus, there is a great need in the art for circularly polarizing film material having reflection and transmission characteristics over a bandwidth that is substantially greater than the bandwidth provided by all prior art circularly polarizing material.

DISCLOSURE OF THE INVENTION

Accordingly, it is a primary object of the present invention to provide a circularly polarizing material which has a reflection and transmission bandwidth characteristics that are substantially greater than the reflection and transmission bandwidth characteristics of prior art circularly polarizing CLC material.

Another object is to provide such circularly polarizing material, having reflection and transmission bandwidth characteristics approaching 2000 nm.

Another object is to provide such circularly polarizing material having improved spectral and band-pass position characteristics.

Another object is to provide circularly polarizing material having such bandwidth characteristics, and being realized in a single thin film of CLC material in which the pitch of the helices of the CLC molecules varies in a non-linear manner along the depth dimension (i.e. transverse to the surface) of the CLC film structure.

Another object of the present invention is to provide such circularly polarizing material in the form of an extremely broad-band polarizing ink and/or paint.

Another object of the present invention is to provide a palette of CLC-based colored paints and/or inks, for use in various color applications including painting, printing and the like.

Another object is to provide super broad-band circular (or linear) polarizers realized on CLC film structures and having notch-characteristics suitable for color filtering and imparting applications.

Another object is to provide super broad-band CLC polarizing films which have reflection and transmission bandwidths that are over twice the extent of the prior art CLC polarizing films of the same overall thickness.

Another object is to provide single layer polarizers of extremely broad bandwidth wherein the liquid crystal component of the polarizer assumes a non-linear distribution across the thickness of the polarizer.

Another object is to provide such circularly polarizing material, wherein the liquid crystal material may be non-polymerizable or of low molecular weight in the present invention.

Another object is to provide a method of fabricating circularly polarizing material having extremely broad-band spectral reflection and transmission characteristics, low optical loss properties, high polarizing efficiency and low manufacturing cost.

Another object is to provide a method of fabricating circularly polarizing material having extremely broad-band spectral band-pass characteristics, low optical loss properties, high polarizing efficiency, simplified fabrication, and low manufacturing cost.

Another object is to provide a method of fabricating extremely broad-band polarizers using a mixture of polymerizable CLC, liquid crystal material and a photoinitiator, wherein during polymerization of the polymerizable CLC, the segregation rate of the liquid crystal material is constrained to be greater than the polymerization rate of the polymerizable CLC being polymerized.

Another object is to provide a method of fabricating extremely broad-band polarizers, in a way which does not employ ultraviolet dye during the manufacture thereof.

Another object is to provide a method of fabricating super broad-band circularly polarizing material, wherein the polymerizable CLC being polymerized is exposed to a non-linear (e.g. exponential) intensity gradient of actinic (e.g. UV) radiation by virtue of light loss within the polymerizable CLC medium, thereby causing a non-linear variation in pitch of helices of the CLC molecules therein.

Another object is to provide a method of fabricating super broad-band circularly polarizing material, using commercially available constituent cholesteric liquid crystal polymers and liquid crystal material.

Yet another object is to provide a method of fabricating free standing circularly polarizing film having reflection and transmission characteristics over a super broad-band extending up to about 2000 nm.

These and other Objects of the Present Invention will become apparent hereinafter and in the Claims to Invention.

In accordance with a first aspect of the present invention, circularly polarizing material of novel construction is disclosed. Unlike any prior art reflective circular polarizer, the circularly polarizing material of the present invention has reflection and transmission bandwidth characteristics that extend over a super broad-band of wavelengths (e.g. up to 2000 nm). The circularly polarizing material of the present invention is made from a film of polymerizable material having a cholesteric order (e.g. polymerizable CLC film), in which non-cross linkable liquid crystal molecules (e.g. having a nematic phase) are distributed in a non-linear fashion in a plurality of liquid crystal-rich and liquid crystal-depleted sites across the thickness of the polymerizable CLC film. Depending on the final spiral structure of the polymerizable CLC materials utilized, the resulting circularly polarizing films of the present invention will reflect either left-handed or right-handed circularly polarized light having wavelengths within the above-described super broad-band portion of the electromagnetic spectrum.

The super broad-band, circularly polarizing reflective material of the present invention can be used to fabricate numerous types of products, namely: super broad-band circularly polarizing panels; super broad-band color filters; super broad-band circularly polarizing pigment flakes used as colorants in inks and/or paints; glare-reducing sunglasses; micropolarization panels and polarizing eyewear used in SMI-based stereoscopic 3-D display and viewing applications; and the like.

According to a second aspect of the present invention, a novel method is disclosed for fabricating the super broad-band circularly polarizing material of the present invention. According to the method, a cholesteric liquid crystal (CLC) polymer (having a cholesteric order) is mixed with non-cross linkable liquid crystal material (e.g. having a nematic order), a photoinitiator, and a chiral additive which may or may not be chemically attached to the polymer at a temperature which maintains the mixture in a liquid state having a cholesteric order. Preferably, the liquid crystal material and polymerizable CLC chemically attached with the chiral additive (chiral group) are present in a ratio by weight of 1:2 but may be present in a ratio range by weight of 3:1 to 1:6 depending on all the conditions involved. Preferably, the photoinitiator is present in an amount of 0.6% by weight in the mixture but may be present in higher or lower amounts so long as the amount is sufficient to initiate polymerization of the polymerizable CLC material. In general, the amount of the photoinitiator introduced into the mixture should be such that, when the mixture is exposed to actinic radiation, the polymerization rate of the polymerizable CLC is slower than the segregation rate of the liquid crystal material.

While heating the mixture to, for example 92° C., in order to retain its cholesteric order, the mixture is subjected to actinic radiation (e.g. ultraviolet light) for a time and at an intensity sufficient to polymerize the polymerizable CLC or the liquid crystal material or both. Because the actinic light has an exponential intensity distribution due to light attenuation by, for example, light absorption and/or scattering, polymerization occurs in a non-linear fashion, thereby resulting in a non-linear distribution of the polymer and the liquid crystal material across the film. During polymerization, phase separation takes place. The segregation rate of the liquid crystal material is designed to be greater than the polymerization rate of the polymerizable CLC being polymerized. Thus, the liquid crystal material segregates and diffuses to sites of enlarged pitch in the polymerizable CLC material from sites of shrunken pitch in the polymerizable CLC material. Consequently, an exponentially distributed pitch is generated from one surface to the other of the polymerizable CLC film. It has been demonstrated that the novel composition of this circularly polarizing reflective material provides for its markedly improved, super broad-band reflection and transmission characteristics.

While it is believed that any non-linear distribution of pitch of the helices of the liquid crystal material will produce super broad-band circularly polarizing material in accordance with the teachings of the present invention, the preferred embodiments thereof disclosed herein each have an exponentially distributed pitch extending from one surface of the polarizing film to the other surface thereof.

BRIEF DESCRIPTION OF THE DRAWINGS

In order to more fully understand the objects and features of the present invention, the following Detailed Description of the Illustrative Embodiments should be read in conjunction with the accompanying Drawings, wherein.

BEST MODES FOR CARRYING OUT THE PRESENT INVENTION

Figure 1:
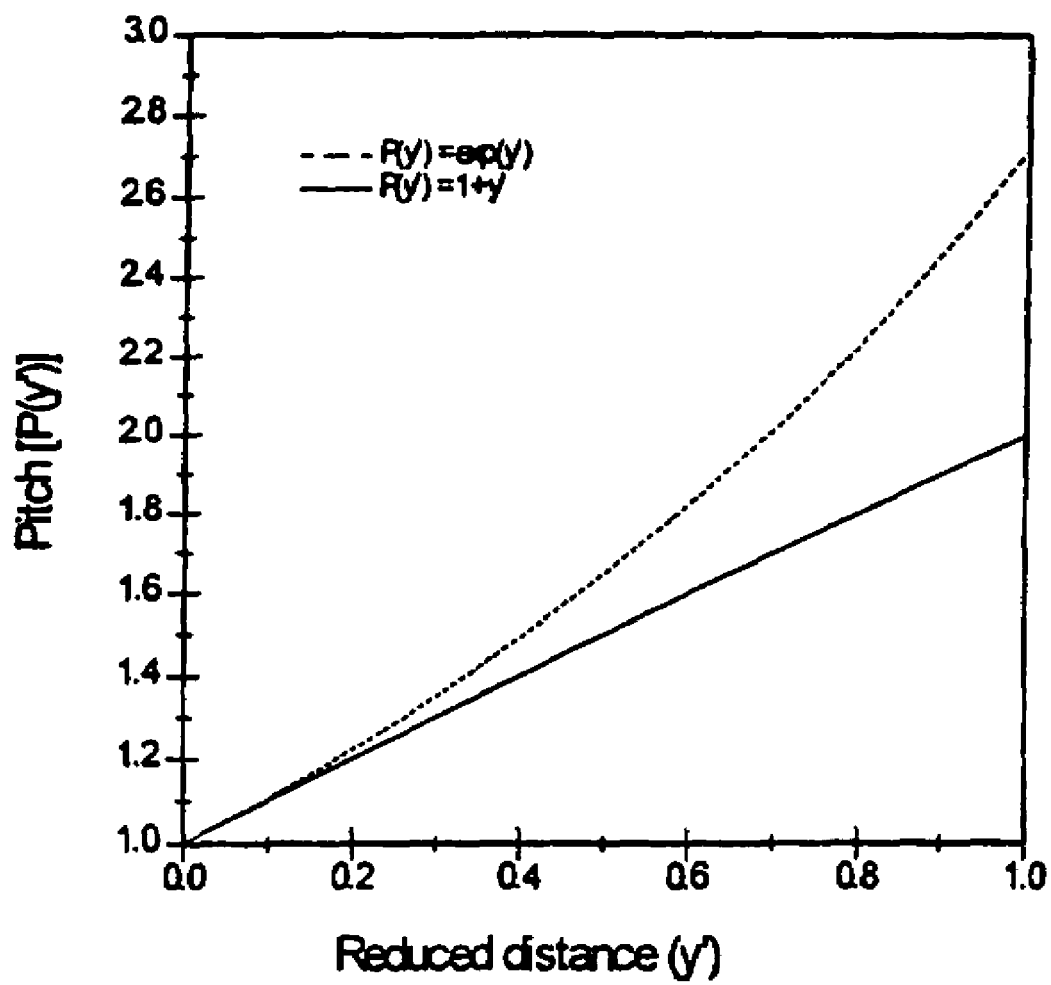
FIG. 1 shows, as dashed line, a graph of the exponential pitch variation of the helices of the liquid crystal material inside a super broad-band polarizer of the present invention plotted as a function of reduced distance therein, and as a solid line, a graph of the linear pitch variation of the helices of the liquid crystal material inside a prior art broad-band polarizer plotted as a function of reduced distance therein.

Suprisingly, it has been discovered that in order to produce CLC film material having the super broad-band polarizing reflection and transmission characteristics up to 2000 nm, it is essential that the pitch of helices of CLC molecules within the CLC film material must vary non-linearly along the depth thereof.

Unexpectedly, Applicants have also discovered that the super broad-band circularly polarizing material of the present invention can be produced by: (1) eliminating the use of ultraviolet dyes in the CLC (raw) starting mixture; and (2) using polymerizable CLC materials, non-cross linkable liquid crystal materials (of the nematic phase), and a suitable photoinitiator in an amount which ensures, in the presence of a known amount of incident actinic radiation employed during polymerization (I.e. curing), that the polymerization rate of the polymerizable CLC will be slower than the segregation rate of the liquid crystal material. By satisfying these conditions, it has been found that circularly polarizing film material having super broad-band reflection characteristics can be made in a wide variety of ways without departing from the present invention. The details of the novel fabrication processes hereof will be described herein below.

General Method of Fabricating CLC Polarizing Film Material Hereof

The general method of fabricating the super broad-band circularly polarizing material of the present invention involves mixing together the following constituents: (i) a polymerizable liquid crystal material having a cholesteric order (e.g. side-chain cyclic liquid crystal polysiloxanes); (ii) a liquid crystal material having a nematic; and an amount of suitable photoinitiator which satisfies the above-described fabrication constraints.

In the illustrative embodiments of the present invention illustrated in the Examples 1–13 described herein, the polymerizable CLC materials used in the manufacturing process are commercially available from Wacker GmbH, Germany, and are polymerized by way of a cationic polymerization process when the polymerizable CLC materials are exposed to ultraviolet radiation in the presence of a photoinitiator. The polymerizable CLC material is available in blue (CC4039L) and red (CC4070L) compounds, both of which have a left-handed spiral structure. The blue compound reflects unpolarized light at 390 nm and the red compound reflects unpolarized light at 690 nm after UV curing at 70° C. The polymerizable CLC material is also available in a right-handed spiral structure, such as CLC polysiloxane (CC4039R) blue compound. When this compound (CC4039R) is mixed with a left-handed polymerizable CLC, like CC4039L, in a suitable ratio, the resulting CLC film reflects right-handed circularly polarized light when cured at 70° C. Before curing, the raw CLC material exhibits a rubbery state at room temperature and turns to liquid at around 70° C.

Nematic liquid crystal materials for use with the above polymerizable CLC materials are commercially available from EM Industries, Germany, as E31LV and E7.

In the following examples of the illustrative embodiments to be described in detail below, the polymerizable CLC, the nematic liquid crystal material, the photoinitiator (and in one example, a chiral additive) were weighed in a desired ratio and mixed together on a hot plate. In each example, the CLC mixture was introduced into a glass cell that had a buffed polyimide coating for better molecular alignment. Finally, the mixture was cured (e.g. polymerized) at a selected temperature by exposing the mixture to actinic light for a time sufficient to permit polymerization to go to completion. The actinic radiation (UV radiation) used to polymerize the CLC film material, exhibits a non-linear (e.g. exponential) intensity distribution within the CLC film or layer being cured, rather than the linear intensity distribution used during prior art fabrication processes. This is due to light attenuation caused by the materials used to make the CLC mixture layer. Apart from the above, either the liquid crystal material or the CLC material may be in the liquid state in the finally formed polarizers.

After mixing at a temperature which keeps the materials in a liquid state and before polymerization, the nematic liquid crystal material is weakly bound to the polymerizable CLC material. In response to actinic radiation exposure, polymerization causes the weakly bound liquid crystals to segregate from the polymerizable CLC and begin to diffuse. The nematic liquid crystal material diffuses to swollen regions of the polymerizable CLC forming liquid crystal-rich sites. The departure of liquid crystal from other regions of the polymerizable CLC leaves liquid crystal-depleted sites. Because the radiation intensity is non-linear (more specifically, an exponential) in character throughout the medium and the higher intensity regions of polymerizable CLC are more swollen than lower intensity regions, the nematic liquid crystal material diffuses preferentially to sites of higher radiation intensity and assumes a non-linear distribution in the polymer CLC material.

Advantageously, the super broad-band polarizers of the present invention can be made using commercially available materials provided the segregation rate of the liquid crystal is greater than the polymerization rate of the material being polymerized.

Super Broad-band Reflecting Characteristics of the CLC Circularly Polarizing Film of the Present Invention It is appropriate at this juncture to briefly reflect on how the non-linear pitch distribution across the CLC polarizing material hereof contributes to its super broad-band characteristics, as well as review some empirically gathered data to support its bandwidth superiority over prior art polarizing technology. With regard to this discussion, reference shall be made to the FIGS. 1–5 of the Drawings.

Figure 2:
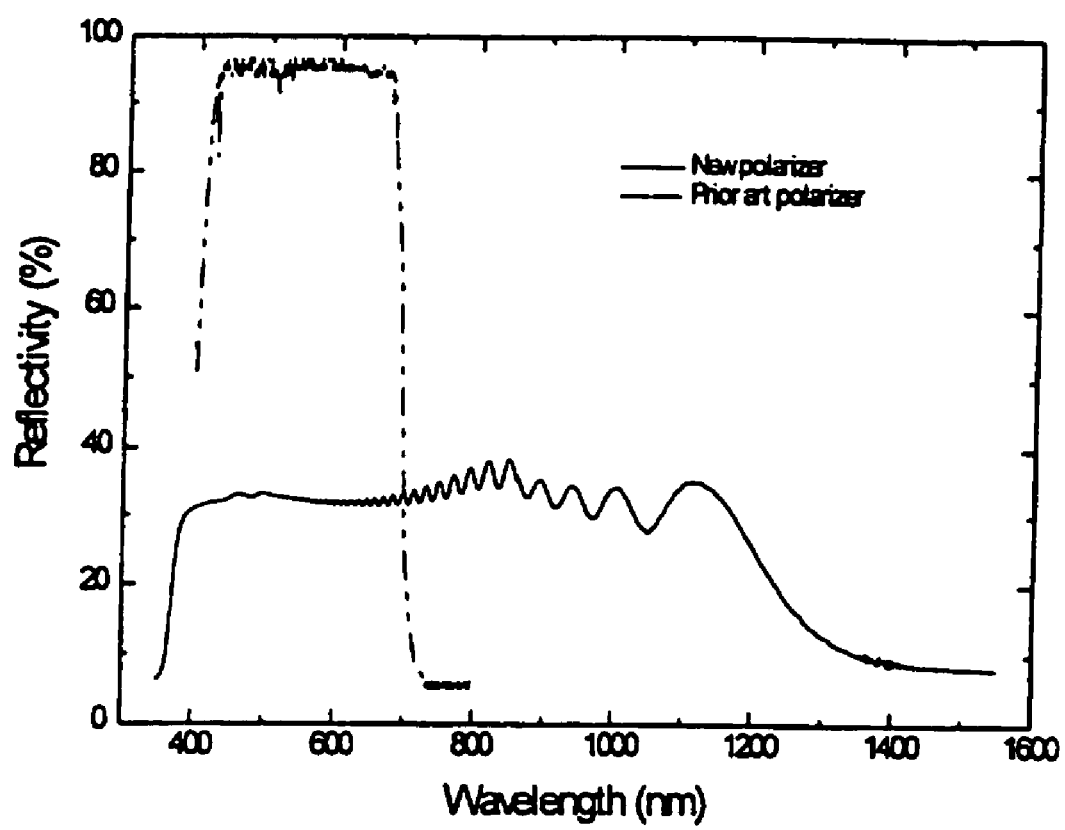
FIG. 2 shows, as a solid line, a graph of the reflectivity of light off a super broad-band polarizer of the present invention plotted as a function of wavelength, and as a dashed line, a graph of the reflectivity of light off a prior art broad-band polarizer plotted as a function of wavelength.

In FIG. 1, a comparison is made between a linear pitch distribution $P_l(y')$ and an exponential pitch distribution $P_e(y')$ expressed as a function of reduced distance, y'. The linear distribution is defined as:

$$P_l(y')=1+y'=1+y/d, \quad (1a)$$

whereas the exponential distribution is expressed as:

$$P_e(y')=\exp[y'], \quad (1b)$$

respectively, where d is the film thickness. From this characteristic plot, it is clearly seen that the rate of change of pitch in the exponential function is much steeper than the rate of change of pitch in the linear function. For the same thickness, the band width of the polarizer in which the pitch follows an exponential distribution would be much broader than that of a polarizer having a pitch which is linearly distributed. In FIG. 2, this fact is shown by comparing the typical bandwidth of a polarizer of an illustrative embodiment of the present invention, with the bandwidth of prior art CLC polarizer technology.

In FIG. 2, the reflection spectrum of a prior art polarizer (represented by dashed line) was obtained using a circularly polarized light beam having a handedness that fits the helical sense of the polarizer. However, the spectrum of the circular polarizer of the present invention (represented by the solid line) was measured by using un-polarized light beam. An observation of FIG. 2 clearly shows that the bandwidth of the circular polarizer fabricated in accordance with the teachings of the present invention is over twice the extent of the bandwidth of the prior art circular polarizer, even though their overall thickness is same.

Figure 3:
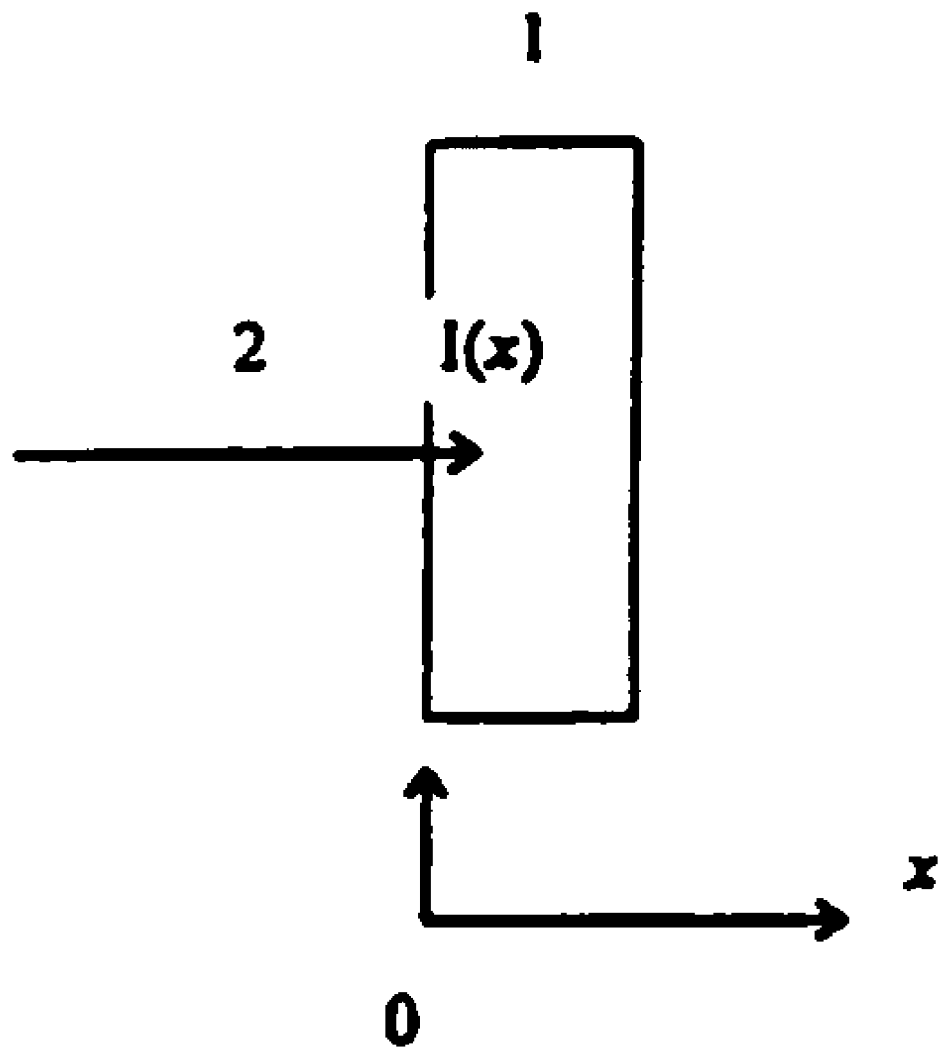
FIG. 3 is a cross-sectional view of a layer of CLC material during polymerization comprising a mixture of polymerizable CLC, liquid crystal material (of nematic phase) and a photoinitiator, with actinic radiation (e.g. ultraviolet light) incident on the surface thereof having an intensity (Io) and an intensity, I(x), at position "x" inside the CLC layer.
Figure 4:
FIG. 4 is a schematic representation of an image of a polymerized film obtained using an Atomic Force Microscope (AFM) which measures pitch distribution of the helices of the liquid crystal material in the polymerized CLC film, with the distance between any pair of dark lines representative of one half of the CLC pitch.
Figure 5:
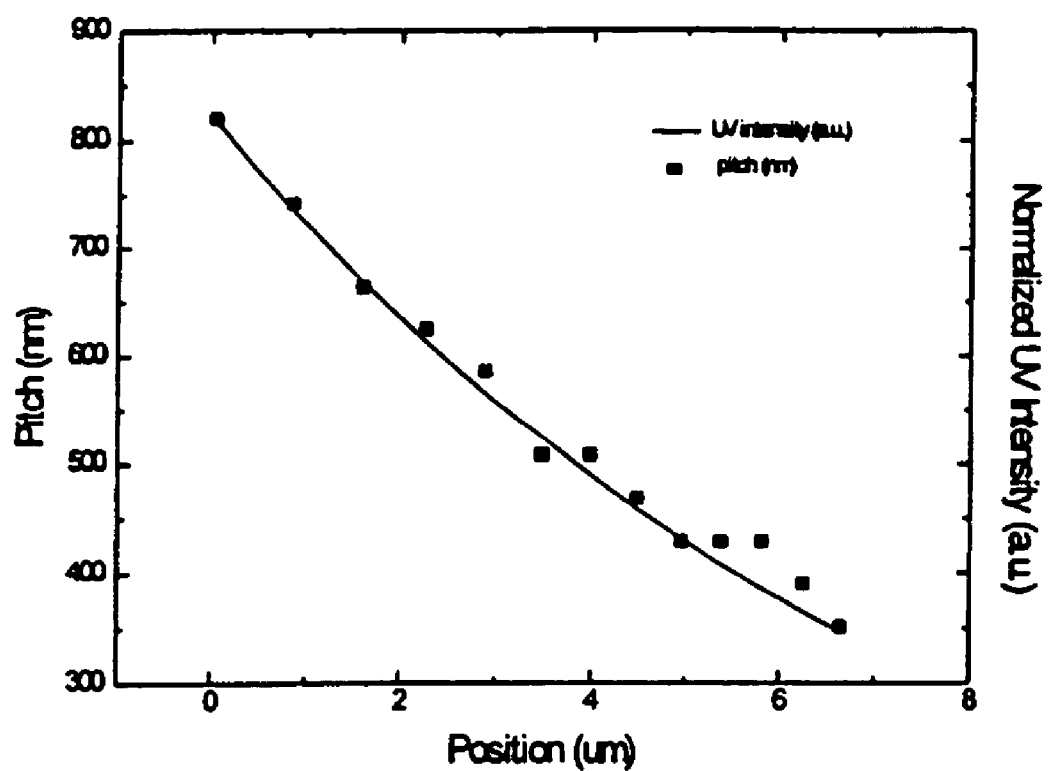
FIG. 5 shows, as black squares, a graph of pitch variation across a layer of polymerized CLC film, and also as a solid line, a graph of the normalized UV intensity decay across the same layer of CLC film.

In FIGS. 3 through 5, further support is provided for the fact that the non-linear pitch distribution across the CLC polarizing material hereof contributes to its super broad-band characteristics. In FIG. 3, a cross-sectional view of a layer or film of polymerizable CLC is shown, on which electromagnetic radiation like actinic or ultraviolet light, $I_o$, is incident. Polymerizable CLC film 1 also includes a nematic liquid crystal and a photoinitiator. Radiation, indicated by 2, in the form of ultraviolet light has an intensity, I(x), at some position "x" inside CLC layer 1. Assuming an ultraviolet absorbent coefficient , the following equation (2) can be derived in a well known manner:

$$I(x)=I_o \exp(-\alpha x) \quad (2)$$

where the absorbent coefficient α includes all light loss sources, such as absorption, scattering, etc. The solution to equation (2) shows an exponential decay in intensity from the front surface to the back surface of the polymerizable CLC layer or film 1.

In FIG. 4, there is shown a drawing of an Atomic Force Microscope (AFM) image which measures the pitch distribution in a polymerized CLC layer or film like layer 1 of FIG. 3. In FIG. 4, the front of CLC film or layer 1 is disposed on the right hand side of the drawing. The pitch variation is shown over an arbitrary range of 0–10 m to indicate the scale of the values involved. Using a cross-section of the polymerizable CLC layer 1, a probe is scanned across the thickness of the sample and current variations are produced in the probe in response to the pitch variation which is related to the amounts of the liquid crystal which have segregated and diffused during exposure of film 1 to actinic or ultraviolet light. Because the intensity of radiation is the greatest of the right-hand side of film 1, one would expect greater swelling of the CLC material at regions of higher intensity thereby providing sites for the greater accumulation of diffusing liquid crystal material at these sites. As a result, a longer pitch is formed. Of course, at regions of lower and lower intensity, less and less swelling occurs and less and less accumulation of diffusing liquid crystal occurs, resulting in a shorter pitch. When polymerization has gone to completion, film 1 exhibits a non-linear variation in pitch which, in turn, permits the total reflection of incident light over a very large bandwidth. The regions of greater pitch, of course, reflect lower frequencies than the regions of smaller pitch which reflect higher frequencies. The difference between the highest frequency reflected and the lowest frequency is the bandwidth of the polarizer.

As can be seen from a consideration of FIG. 5, the pitch variation within the CLC polymerized film structure is indeed non-linear (here, it is exponential). In this figure, there is shown a graphical representation of the ultraviolet light intensity decay of equation (1) versus the measured pitch variation of FIG. 4 across the film or layer of FIG. 3. The solid curve in FIG. 5 is a plot of equation (2) using a UV absorbent coefficient which was measured in an independent measurement of layer or film 1. The scale of the curve has been arbitrarily normalized. The variation in pitch as determined from FIG. 4 is also plotted in FIG. 5. Half of the pitch in CLC film 1, at any point, is determined by the distance between any pair of black or white lines in FIG. 4. Pitch in nanometers (nm) is plotted versus position in micrometers (m) and the square dots show the value of pitch at selected points in FIG. 5. From FIG. 5, it is seen that the non-linear CLC pitch variation across the polymerized CLC film 1 follows the exponential decay of the solid line curve of the UV intensity caused by light loss therein during the polymerization process. This clearly shows that the pitch of polymerized CLC film 1 at any point through the thickness of film 1 is directly proportional to the radiation intensity at that point and that the total pitch variation across layer 1 is exponential in character.

EXAMPLE 1

In this example, the red compound of CLC polysiloxane (CC4070L) mentioned above, is blended with E31 nematic liquid crystal, also mentioned above. The red CC4070L has a left-handed twist sense and reflects at 690 nm when cured at 70° C. The mixture contains E31/CC4070L in a ratio of 1/2 by weight with 0.6% IG184 photoinitiator by weight. Photoinitiator IG184 is commercially available from Ciba Geigy, Hawthorne, N.Y. The mixture is introduced into a 20 glass cell and cured at an ultraviolet intensity of 0.047 mW/cm$^2$ at a temperature, provided by a hotplate, of 92° C. In this example, only the CLC polysiloxane material is polymerized while the nematic liquid crystal remains in the liquid state. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light. The resulting polarizer covered a spectral band pass from 560 nm to 2160 nm providing a super bandwidth polarizer of 1600 nm.

EXAMPLE 2

In this example, the blue compound of CLC polysiloxane (CC 4039L) and nematic liquid crystal (E31) are mixed in a ratio of 2:1 by weight along with photoinitiator (IG184) of 0.6% by weight. A 20 glass cell is used to provide a film of that thickness. The CLC is cured by a UV lamp of 0.047 mW/cm$^2$ at 92° C. The resulting polarizing layer covered a spectral band pass from 370 nm to 1,200 nm providing a super bandwidth polarizer of 830 nm, covering the whole visible and near IR spectral band. As with Example 1, the liquid crystal material (E31) remains in the liquid state after curing. After polymerization (i.e. curing), spectral analysis of the resulting circularly polarizing film material was carried out on a Perkin-Elmer, Lambda 19 spectrophotometer. Both transmission and reflection spectra were taken with the left-hand, right-hand and unpolarized light.

EXAMPLE 3

The two previous example utilized CLC polysiloxanes which had a left-handed twist sense. In this third example, a CLC polysiloxane having a right-handed helical (twist) sense is utilized. A blue compound (CC4070R) with such a twist sense is commercially available from Wacker, GmbH, Germany and reflects right-handed circular light at 390 nm when cured at 70° C. A nematic liquid crystal material (M15) commercially available from EM Industries, Germany, is mixed with the CLC polysiloxane material (CC 4039R) in a ratio of 1:2 by weight with 1% IG184 photoinitiator by weight. The mixture is sandwiched between the plates of a 20 glass cell and cured at a UV intensity of 0.047 mW/cm$^2$ at 122° C. The resulting circularly polarizing film material reflective of right-hand circularly polarized light, covered a spectral band pass from 520 nm to 920 nm providing a super broad bandwidth polarizer of 400 nm. After curing (i.e. polymerization), the non-polymerizable liquid crystal (M-15) is in the solid state at room temperature. After polymerization, spectral analysis of the resulting samples was carried out on a Perkin-Elmer, Lambda 19 spectrophotometer. Both transmission and reflection spectra were taken with the left-hand, right-hand and unpolarized light

EXAMPLE 4

In this example, the CLC material utilized is non-polymerizable while the nematic liquid crystal is polymerizable providing a super broad-band polarizing material in which the CLC is in the liquid crystal state after curing. To create a suitable non-polymerizable CLC material, the liquid crystal material E31 is mixed with another liquid crystal material ZLI-2309 and a chiral additive S1011 all of which are commercially available from EM Industries, Germany. The resulting non-polymerizable CLC material is of low molecular weight and the chiral additive induces a left-handed spiral structure in the mixture. E31/ZLI-2309/S1011 are mixed together in a ratio of 1/1/0.2 by weight. The CLC material is then mixed with a polymerizable nematic liquid crystal polymer material CN 4000 in a ratio of 1:2 by weight. CN 4000 is commercially available from Wacker GmbH, Germany. The mixture along with a photoinitiator IG184 of 0.6% by weight is introduced into a cell formed from two pieces of rubbed polyimide coated glass substrates 20 apart and cured at a UV intensity of 0.047 mW/cm$^2$ at a temperature of 70° C. Here this nematic liquid crystal material CN4000, polymerizes while the low molecular weight CLC material remains in the liquid state. As with all other examples, the segregation rate of the liquid crystal material is greater than its polymerization rate of the polymerizable CLC material. The resulting circularly polarizing film material reflects left-handed circularly polarized radiation and covers a spectral band pass from 430 nm to 1050 nm providing a super broad bandwidth polarizer of 620 nm. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

EXAMPLE 5

In this example, the mixture consists of cross-linkable siloxane polymer in nematic order and chiral additive plus photoinitiator (IG184). Notably, no non-cross-linkable nematic liquid crystals (such as E31) are added. The siloxane nematic polymer (CN 4000) is from Wacker (German). The chiral additive consists of R1011, CB15, and CE1 (all from Merck, EMI). The mixture is CN4000/R1011/CB15/CE1/IG184=0.75:0.03:0.11:0.11:0.017, by weight. The mixture was then filled into a 20 glass cell with rubbed polyimide coating. After subjected to a UV exposure of around 0.2 mW/cm$^2$ for a sufficient time at a temperature of 80° C., a broad-band reflective polarizer was obtained which has a bandwidth from 360 to 750 nm. Since the chiral additive has a right-handed sense, this polarizer reflects right-handed circular polarization light. The importance of this example is that non-cross-linkable low molecular weight nematic liquid crystals are not necessarily needed to create super broadband circularly polarizing film material, in accordance with the teachings of the present invention. A nematic liquid crystal polymer mixed simply with chiral additive will create a similar super broad-band polarizer. The same mechanism, i.e., polymerization induced molecular re-distribution (PIMRD), is still valid in this example. Since all the components of the chiral additive (i.e., R1011, CB15, CE1) are non-cross-linkable, the chiral molecules experience a phase separation and segregation from the nematic polymer network during polymerization. The segregated chiral molecules start to diffuse along the UV propagation direction, resulting in an accumulation and depletion of the chiral molecules in sites where the CLC pitch get shorter and longer, respectively. Finally, a pitch gradient is formed. Notably, the chiral additive is in a plural compound format. As evidenced by a separate experiment, two of the chiral compounds, i.e., CB15 and CE1, are phase separated from the liquid crystal polymer network and diffuse along the UV propagation direction during polymerization. However, the third chiral compound, R1011, does not show obvious evidence of phase separation and diffusion. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

EXAMPLE 6

In this example, a method is described for fabricating the super broad-band CLC circularity polarizing material on a plastic substrate, which, possibly, has one surface free of substrate. The liquid crystal mixture used in this example can be any one mentioned throughout this application. The typical plastic substrate used is PET. The PET surface may or may not be necessarily treated with a rubbed polyimide coating. If no polyimide coating is required, the whole manufacture process becomes much simpler. The only treatment required of the PET substrate is mechanical rubbing its bare surface. The CLC mixture is applied onto one of the plastic substrate, which then covered with a second PET sheet. Thereafter, the whole package is fed into a laminator at a suitable temperature. After lamination, a uniform CLC film is obtained between of the two pieces of plastic sheet material. The film is then subjected to a UV exposure with a suitable intensity for a sufficiently long time at a temperature of 80° C. A super broad-band CLC polarizer is obtained between plastic sheets. The optical property, including the extinction ratio, is similar to that between two glass substrates with rubbed polyimide. Finally, one of the plastic substrates can be pealed off so that one surface is free of substrate. The above-described method has the following advantages: (1) the overall polarizer thickness is dramatically reduced to 0.25 mm due to the very thin plastic sheets; (2) the polarizer is mechanically flexible; (3) the manufacture procedure is simple; (4) larger size polarizer can be made; and (5) cost is substantially reduced. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

EXAMPLE 7

In this example, broad-band CLC circularly polarizing film material is made using a newly developed short pitch CLC liquid crystal polymer. This material (code name is CLM001CC, from Wacker, German) reflects left-handed circular polarization light at a selective reflection wavelength 309 nm. Once mixed with suitable amount of photoinitiator (such as IG184, Cyba Geigy), the CLC material can be UV polymerized. In order to make broad-band polarizing film material, the short pitch polymerizable CLC material is mixed with a low molecular weight non-cross-linkable nematic material E7 (EMI). The material composition for broad-band polarizer is CLM001CCE7/IG184=0.157/0.065/0.0047 by weight. The mixture is filled into a 20 glass cell with a rubbed polyimide coating. After exposed to a suitable UV intensity for a sufficient time at 70° C., a broad-band CLC polarizer has been obtained which reflects almost 50% of an un-polarized light from 370 nm to 850 nm. Similar result has been obtained by mixing other non-cross-linkable nematic liquid crystals, such as M15 (Merck). After polymerization, spectral analysis of the resulting samples was carried out on a Perkin-Elmer, Lambda 19 spectrophotometer. Both transmission and reflection spectra were taken with the left-hand, right-hand and unpolarized light.

EXAMPLE 8

In this example, a method is described for fabricating free standing broad-band CLC circularly polarizing film material. The material mixture contains CLM001CC/M15/IG184=2/1/0.06 by weight. The mixture was filled into a 20 glass cell with a rubbed polyimide. The sample was cured at 80° C. by a UV intensity of 0.011 mW/cm$^2$. The resulted film reflects from 370 nm to 770 nm. After polymerization and while supported on the glass substrate, spectral analysis of the resulting circularly polarizing film material was carried out on a Perkin-Elmer, Lambda 19 spectrophotometer. Both transmission and reflection spectra were taken with the left-hand, right-hand and unpolarized light. Thereafter, one of the glass substrate was mechanically removed. Next, the broad-band film was pealed away from the remaining glass substrate. A free standing broad-band polarizing film has been obtained. The film spectra before and after pealing demonstrates that the optical property of the free standing broad-band polarizing film has not been changed. The produced broad-band circularly polarizing film is very flexible and can be bent arbitrarily to any degree. In addition, it can be laminated onto any substrates.

EXAMPLE 9

In this example, a method is described for fabricating a quasi-broadband linear polarizer based on the free standing CLC circularly polarizing film. This linear polarizer has been obtained by laminating the said produced free standing CLC polarizing film directly onto a quarter wavelength plate or sheet, such as a stretched sheet of polyvinyl alcohol (PVA). The lamination is performed with the help from a laminator. Again, no degradation of the optical property has been obviously observed after the lamination operation. After lamination, spectral analysis of the resulting quasi-broadband linear polarizer was carried out on a Perkin-Elmer, Lambda 19 spectrophotometer. Both transmission and reflection spectra were taken.

Optionally, the free-standing CLC circularly polarizing film of the present invention can be laminated onto other types of phase-retardation plates to achieve either a circularly or linearly polarizing film structure, as desired or required. In connection therewith, reference is made to Applicant's U.S. Pat. No. 5,221,982, incorporated herein by reference, for an excellent tutorial and overview on the principles of polarization state conversion (i.e. linear-to-circular, circular-to-linear, linear-to-linear, circular-to-circular, unpolarized-to-linear, and unpolarized-to-circular).

EXAMPLE 10

In this example, a method is described for fabricating a special broad-band polarizing ink based on the super broad-band circularly polarizing material of the present invention. According to the method, free standing broad-band circularly polarizing film is made as described above. The free standing film is then mechanically fractured into micro-sized flakes using any of the techniques described in Applicant's U.S. Pat. No. 5,364,557 entitled "Cholesteric Liquid Crystal Inks", incorporated herein by reference. Thereafter, the CLC flakes are mixed with a carrier liquid such as lacquer (for example, PUL Varnish, Marabu, German) which is optically clear and thermally curable. To test the optical properties of the broadband CLC-based ink formed thereby, the CLC ink was screen-printed onto a radiation absorbing substrate (i.e. providing a black background). It is understood, however, that the CLC ink can be applied to virtually any radiation absorbing surface, having either 2-D or 3-D surface characteristics. The extinction ratio of the CLC ink was checked with a pair of orthogonal circular polarizers. Since the CLC flakes still preserve the left-handed polarization property (i.e., reflects left-handed circular polarization light) a bright and white light is seen reflected from the ink through a left-hand polarizer covering the painted ink. Otherwise, a black background is seen as if the ink is covered with a right-handed circular polarizer. Spectral analysis of the resulting CLC ink was carried out on a Perkin-Elmer, Lambda 19 spectrophotometer. Both transmission and reflection spectra were taken with the left-hand, right-hand and unpolarized light.

The super broad-band circularly polarizing material of the present invention can be used to fabricate CLC paints using any of the techniques disclosed in Applicant's U.S. Pat. No. 5,364,557. In order to impart color characteristics to the CLC pigments (e.g. ink and/or paint) hereof, any of the techniques described herein below in the section entitled "Controlling The Bandwidth And Spectral Position Of The Circularly Polarizing Material Of The Present Invention" can be used with excellent results.

EXAMPLE 11

In this example, the CLC material utilized is a left-handed polymerizable polysiloxane CLC (CC4039L) commercially available from Wacker, GbmH, Germany mixed with a non-polymerizable nematic E7 and a chiral additive R1011 both of which are commercially available from EM Industries, Germany. The polymerizable CLC material (CC4039L) has a left-handed twist structure while the chiral additive (R1011) has a right-handed twist structure. The materials E7/CC4039L/R1011/IG184 are present in a mixture in ratios of 1/2/0.1/0.012 by weight. IG184 is a photo-initiator. The mixture was introduced into a 20 thick glass cell with a rubbed polyimide coating and was cured at a UV intensity of 0.047 mW/cm$^2$ at 82° C. In this example, the cholesteric liquid crystal material (CC4039L) polymerizes while the nematic (E7) remains in the liquid state after curing. As with the other examples, the segregation rate of the non-polymerizable liquid crystal is greater than the polymerization rate of the polysiloxane. After polymerization, spectral analysis of the resulting samples was carried out on a Perkin-Elmer, Lambda 19 spectrophotometer. Both transmission and reflection spectra were taken with the left-hand, right-hand and unpolarized light. The resulting CLC circularly polarizing film reflects left-handed circularly polarized radiation and covers a spectral band pass from 800 nm to 1428 nm, providing a super broad bandwidth polarizer of over 600 nm in the near infrared (IR) region of the electromagnetic spectrum. In this example, the chiral additive is utilized to control the band position and different concentrations will control the band passes available.

EXAMPLE 12

In this example, a broad-band CLC polarizer is fabricated based on an acrylate liquid crystal compound in cholesteric order mixed with non-crosslinkable nematic liquid crystals. Two polymerizable acrylate cholesteric liquid crystal compounds, CM 95 and CM 94 (BASF, Aktiengesellschaft, Ludwigshafen, German), reflecting right-handed circular polarization at blue and red wavelength, respectively, are used in this example. The blue compound, CM95, is mixed with a non-cross-linkable nematic M15 (EMI) and photo initiator IG184 (Cyba Geigy) at a ratio of CM:M15: IG184=2:1:0.06 by weight. The mixture is filled into a 20 glass cell with rubbed polyimide coating and cured at 35° C. with a suitable UV irradiation for a sufficiently long time. The resulted broad-band polarizer reflects right-handed light from 590 nm to 900 nm, with a bandwidth about 310 nm. Other nematic materials such as E7, etc., also can broaden the polarizing bandwidth when mixed with the acrylate CLC and exposed to UV light.

Controlling the Bandwidth and Spectral Position of the CLC Polarizing Material of the Present Invention Bandwidth as well as the spectral position (i.e. "tuning") of the CLC circularly polarizing film material of the present application can be controlled in a number of ways, for a variety of purposes (e.g. imparting color characteristics to the CLC pigments hereof, designing the filtering characteristics of the polarizers hereof, etc.). Below, several techniques are described for carrying out such functions using any of the embodiments of the CLC circularly polarizing material of the present invention.

The first approach controls the spectral bandwidth of the circularly polarizing film material hereof by controlling the thickness thereof. For example, using the materials E31/CC4039L=1:2 by weight with 0.6% IG184, the polarizer bandwidth can be increased from 580 nm to 800 nm when the film thickness is changed from 5 to 20. Thereafter, the polarizer films are cured under a UV intensity of 0.047 mW/cm$^2$ at 92° C.

The second approach controls the spectral bandwidth of the circularly polarizing film material hereof by changing the concentration of the chiral additive. For example, using the material E31/CC4039L=1:2 by weight with 0.6% IG184, with a film thickness of 20, the polarizer film is cured under a UV intensity of 0.047 mW/cm$^2$ at 70° C. When the S1011 chiral additive concentration is increased from 0 to 6.6%, the bandwidth is decreased from 980 nm to 460 nm. In addition, with the increase in chiral concentration, the center wavelength has a "blue" shift toward to shorter wavelength.

The third approach controls the polarizer spectrum with changes in curing temperature. For example, using materials E31/CC4039L=1:2 by weight with 0.6% IG184, with a film thickness of 20, the samples are cured under a UV intensity of 0.047 mW/cm$^2$. If the curing temperature is lowered from 92° C. to 70° C., the center wavelength has a "red" shift toward a longer wavelength.

The fourth approach controls the polarizer spectrum by changing the photoinitiator concentration. For example, using materials E31/CC4039L=1:2 by weight, with a film thickness of 20, the samples are cured under a UV intensity of 0.047 mW/cm$^2$ at 92° C. Generally, increasing the photoinitiator (IG184) concentration decreases the bandwidth of the polarizer.

Figure 6:
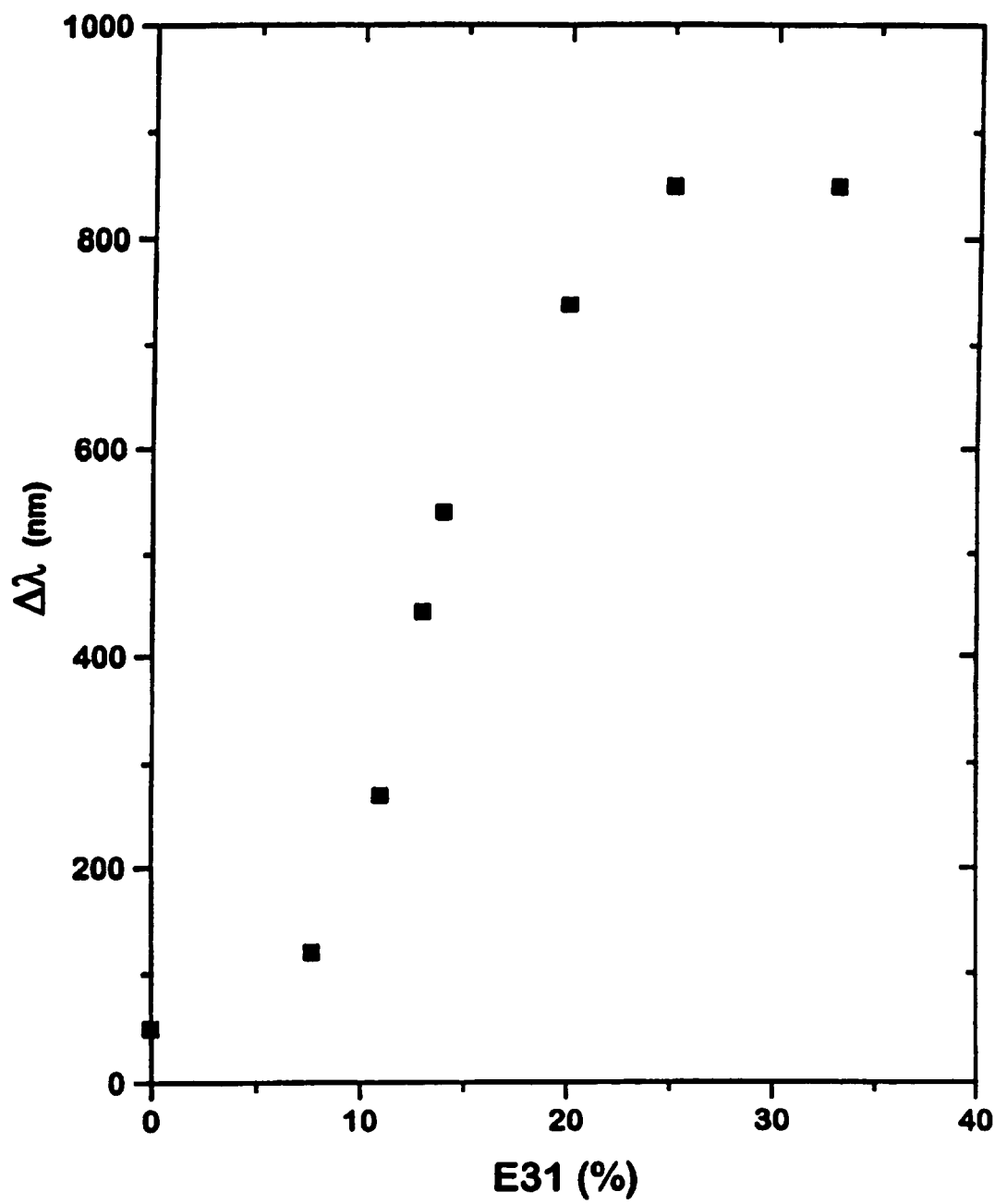
FIG. 6 is a graphical representation of the reflective bandwidth of a 20 micron circularly polarizing film plotted as a function of the nematic E31 concentration thereof cured using a UV intensity of 0.047 mW/cm$^2$ at 92° C.

The fifth approach controls the polarizer spectrum by changing the concentration of nematic liquid crystals. For example, using a liquid crystal mixture consisting of E31 in CC4039L with a 0.6% IG184 photoinitiator with respect to the CC4039L compound, different mixtures are filled into 20 glass cells with rubbed polyimide coatings. All the samples are cured at 92° C. by a UV intensity of 0.047 mW/cm². As clearly shown in FIG. 6, the bandwidth can be increased by changing the concentration of nematic liquid crystals (E31) in the raw starting mixture.

Most of the above described examples demonstrate that commercially available polymerizable CLC and liquid crystal materials may be utilized to fabricate super broadband polarizing film structures hereof. However, it should be appreciated that the fabrication techniques of the present invention can also be used with any cyclic liquid crystal siloxane, wherein the mesogenic group is attached to a siloxane backbone by hydrosilylation, as well as with any other liquid crystal polymers, such as acrylate, etc.

Similarly, while the nematic liquid crystal material utilized in the above examples are all commercially available, it should also be appreciated that any low molecular weight, non-polymerizable nematic liquid crystal material may be utilized in the practice of the present invention. Also, as shown in Example 4, polymerizable nematics may be used so long as their relative diffusion rate is greater than their polymerization rate.

The nematics utilized may be single compound liquid crystals like K15, K24 and M15 which are commercially available from EM Industries, Germany. Multiple compound mixtures of liquid crystal materials like E31 and E7 commercially available from EM Industries, Germany, and ZLI-2309 and ZLI-5800-100 commercially available from EM Industries, Germany, may also be utilized in the practice of the present invention. All of these liquid crystals are in nematic phase at room temperature except K24 which is in the smectic phase at room temperature. These liquid crystals, when combined with a polymerizable CLC material and a photoinitiator produce polarizers of super broad bandwidth of at least 700 nm. Finally, at low concentrations of liquid crystal material in the polymerizable CLC material, smaller than a ratio of 1/6 by weight, the resulting bandwidth falls off sharply indicating that low concentrations of nematic material are a limiting factor. Also, it should be appreciated that high concentrations of nematic to CLC, like a ratio of 2/3, results in a high reflection if the mixture is polymerized at a suitably lower temperature; otherwise light scattering is induced if the mixture is cured at a non-suitably high temperature.

In above examples, specific UV intensities were prescribed to provide broad-band polarizers. To the extent that polymerization rate is linked to the intensity of incident UV radiation, when a nematic like E7 is used with a CLC material like CC4039L in a ratio of 1/2, the bandwidth of the resulting polarizer decreases as the UV intensity increases. At an intensity of 0.047 mW/cm², for example, the resulting bandwidth is 980 nm. At an intensity of 0.97 mW/cm², the resulting bandwidth is 700 nm if cured at 92° C. and, if cured at 92° C. at 7.1 mW/cm², the resulting bandwidth is 280 nm. This clearly indicates that bandwidth can be controlled by controlling the intensity of UV radiation.

While the preferred embodiments have been characterized as having an exponential distribution of CLC helical pitches, it should be appreciated that departures from an exact exponentially distribution can be tolerated without departing from the spirit of the present invention. Thus, impurities in the materials, radiant energy variations and polymerization variations may cause a departure from an ideal exponential function providing liquid crystal distributions across the thickness of the resulting polarizers which can only be described as being non-linear in character. Departures from the ideal exponential function do not appear to affect the enhancements in bandwidths obtained when the distribution is exponential.

The single layer polarizers of the present application can be fabricated to cover a broad portion of the electromagnetic spectrum including visible, infrared and ultraviolet ranges. From all the foregoing, it should be seen that super broadband polarizers may be obtained using the technique of the present application without the use of dyes or diffusion gradients in the polymerizable CLC material.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

The invention claimed is:

1. A method of forming a single layer polarizer comprising the step of: forming a film from a first liquid crystal material and a second liquid crystal material on a plastic substrate, the second material having a non-linear distribution in said film across the thickness of said film at similarly non-linearly distributed sites disposed in the first material.

2. A method according to claim 1, wherein said first liquid crystal material is selected from the group consisting of polymers, monomers, oligomers, low molecular weight materials, materials having cholesteric order, nematic liquid crystals, smectic liquid crystals, photopolymerizable materials, cholesteric liquid crystals, cyclic liquid crystals, materials which are polymerized by cationic polymerization, and combinations comprising at least one of the foregoing.

3. A method according to claim 1, wherein said second liquid crystal material is selected from the group consisting of nematic liquid crystals, smectic liquid crystals, photopolymerizable materials, materials which are polymerized by cationic polymerization, low molecular weight materials and combinations comprising at least one of the foregoing.

4. A method according to claim 1, wherein at least one of said first liquid crystal material and said second liquid crystal material is polymerizable.

5. A method according to claim 1, wherein segregation rate of said second liquid crystal material is greater than polymerization rate of said first liquid crystal material.

6. A method according to claim 1, wherein the segregation rate of said second liquid crystal material is greater than its polymerization rate.

7. A method according to claim 1, wherein said film has a thickness sufficient to totally reflect incident electromagnetic radiation having polarization state matching that of the film and within a bandwidth in which the film is intended to reflect.

8. A method according to claim 1, wherein said film reflects incident electromagnetic radiation in visible spectrum having polarization state matching that of the film and within a bandwidth in which the film is intended to reflect.

9. A method according to claim 1, wherein said film reflects incident electromagnetic radiation in infrared portion of the electromagnetic spectrum having polarization state matching that of the film and within a bandwidth in which the film is intended to reflect.

10. A method according to claim 1, wherein said film reflects incident electromagnetic radiation in ultraviolet portion of the electromagnetic spectrum having polarization state matching that of the film and within a bandwidth in which the film is intended to reflect.

11. A method according to claim 1, wherein said first liquid crystal material or said second liquid crystal material is in liquid state.

12. A method according to claim 1, wherein at least one of said first liquid crystal material and said second liquid crystal material is in solid state.

13. A method according to claim 1, wherein the step of forming said film includes the step of:
mixing said first liquid crystal material and said second liquid crystal material in a given ratio by weight of first liquid crystal material to said second liquid crystal to form a mixture.

14. A method according to claim 13, wherein said given ratio by weight is 2:1.

15. A method according to claim 13, wherein said given ratio by weight is in a range of 1:3 to 6:1.

16. A method according to claim 15, further including the step of heating said mixture at a temperature sufficient to maintain said mixture in a liquid state.

17. A method according to claim 13, further including the step of adding a photoinitiator into said mixture.

18. A method according to claim 13, further including the step of adding a chiral additive to said mixture.

19. A method according to claim 18, further including the step of irradiating said mixture with electromagnetic radiation to polymerize at least one of said first liquid crystal material and said second liquid crystal material.

20. A method according to claim 19, wherein the step of irradiating said mixture includes the step of applying actinic radiation to said mixture.

21. A broadband polarizer comprising a film of:
a first liquid crystal material having sites of non-linearly varying pitch across the thickness of said film; and
a second liquid crystal material similarly non-linearly distributed across the thickness of said film and disposed at said sites
wherein the first liquid crystal material and the second liquid crystal material are disposed on at least one plastic substrate.

22. A broadband polarizer according to claim 21, wherein said first liquid crystal material selected from the group consisting of polymers, monomers, oligomers, low molecular weight materials, materials having cholesteric order, nematic liquid crystals, smectic liquid crystals, photopolymerizable materials, cholesteric liquid crystals, cyclic liquid crystals, materials which are polymerized by cationic polymerization, and combinations comprising at least one of the foregoing.

23. A broadband polarizer according to claim 21, wherein said first liquid crystal material includes similarly non-linearly distributed sites disposed therein, further wherein said first liquid crystal material has a cholesteric order.

24. A broadband polarizer according to claim 21, wherein said second liquid crystal material is selected from the group consisting of nematic liquid crystals, smectic liquid crystals, photopolymerizable materials, materials which are polymerized by cationic polymerization, low molecular weight materials and combinations comprising at least one of the foregoing.

25. A broadband polarizer according to claim 21, wherein at least one of said first liquid crystal material and said second liquid crystal material is polymerizable.

26. A broadband polarizer according to claim 21, wherein segregation rate of said second liquid crystal material is greater than polymerization rate of said first liquid crystal material.

27. A broadband polarizer according to claim 21, wherein segregation rate of said second liquid crystal material is greater than polymerization rate.

28. A broadband polarizer according to claim 21, wherein said second liquid crystal material is a material which is polymerized by cationic polymerization.

29. A broadband polarizer according to claim 21, wherein said second liquid crystal material is a low molecular weight material.

30. A broadband polarizer according to claim 21, wherein said film has a thickness sufficient to totally reflect incident electromagnetic radiation having polarization state matching that of the film and within a bandwidth in which the film is intended to reflect.

31. A broadband polarizer according to claim 21, wherein said film reflects incident electromagnetic radiation in visible spectrum having polarization state matching that of the film and within a bandwidth in which the film is intended to reflect.

32. A broadband polarizer according to claim 21, wherein said film reflects incident electromagnetic radiation in infrared portion of the electromagnetic spectrum having polarization state matching that of the film and within a bandwidth in which the film is intended to reflect.

33. A broadband polarizer according to claim 21, wherein said film reflects incident electromagnetic radiation in ultraviolet portion of the electromagnetic spectrum having polarization state matching that of the film and within a bandwidth in which the film is intended to reflect.

34. A broadband polarizer according to claim 21, wherein said first liquid crystal material or said second liquid crystal material is in liquid state.

35. A broadband polarizer according to claim 21, wherein at least one of said first liquid crystal material and said second liquid crystal material is in solid state.

36. A broadband polarizer comprising:
a liquid crystal material; and
a chiral additive,
wherein the chiral additive is segregated to form a pitch distribution of sites across the thickness of said polarizer and the liquid crystal material is similarly distributed across the thickness of said polarizer and disposed at said sites,
wherein the liquid crystal material and the chiral additiave are supported on at least one plastic substrate.

37. A broadband polarizer as in claim 36, wherein the liquid crystal material is a nematic.

38. A broadband polarizer as in claim 36, wherein the pitch distribution is non-linear.

39. A broadband polarizer as in claim 36, wherein the pitch distribution is exponential.

* * * * *